United States Patent
Trautenberg et al.

(10) Patent No.: US 8,849,569 B2
(45) Date of Patent: Sep. 30, 2014

(54) METHOD AND APPARATUS FOR TRANSFORMING OVERBOUNDS

(75) Inventors: Hans L. Trautenberg, Ottobrunn (DE); Harald Frankenberger, Ottobrunn (DE)

(73) Assignee: EADS Astrium GmbH, Munich (DE)

( * ) Notice: Subject to any disclaimer, the term of this patent is extended or adjusted under 35 U.S.C. 154(b) by 1859 days.

(21) Appl. No.: 11/683,195

(22) Filed: Mar. 7, 2007

(65) Prior Publication Data

US 2007/0222669 A1 Sep. 27, 2007

(30) Foreign Application Priority Data

Mar. 8, 2006 (EP) ..................................... 06004754

(51) Int. Cl.
*G06F 19/00* (2011.01)
*G01S 13/08* (2006.01)

(52) U.S. Cl.
USPC .... 701/518; 701/478.5; 701/512; 342/357.24

(58) Field of Classification Search
USPC ......... 701/214, 469, 518, 470, 517, 468, 471, 701/500, 512, 478.5; 342/357.58, 126, 342/357.03, 357.2, 357.22, 357.23, 357.24, 342/127
See application file for complete search history.

(56) References Cited

U.S. PATENT DOCUMENTS

| | | | |
|---|---|---|---|
| 7,436,354 B2* | 10/2008 | Lee | 342/357.29 |
| 7,511,660 B2* | 3/2009 | Damidaux et al. | 342/357.45 |
| 7,733,268 B2* | 6/2010 | Harper et al. | 342/357.23 |
| 7,869,949 B2* | 1/2011 | Trautenberg | 701/476 |
| 2008/0074317 A1* | 3/2008 | Harper et al. | 342/357.02 |
| 2009/0213004 A1* | 8/2009 | Rhodes et al. | 342/357.09 |

FOREIGN PATENT DOCUMENTS

EP  1 832 891 B1  5/2013

OTHER PUBLICATIONS

Oehler et al., "The Galileo Integrity Concept", ION GNSS 17th International Technical Meeting of the Satellite Division, Sep. 21-24, 2004, Long Beach, CA, pp. 604-615. (XP-002375520).
Rife et al., "Overbounding SBAS and GRAS Error Distributions with Excess-Mass Functions", Presented at GNSS 2004, The 2004 International Symposium on GNSS/GPS, Dec. 6-8, 2004, Sydney, Australia, (Fifteen (15) pages). (XP-002398121).
Rife et al., "Paired Overbounding and Application to GPS Augmentation", IEEE, 2004, pp. 439-446. (XP-10768906A).
Rife et al., "Core Overbounding and Its Implications for LAAS Integrity", ION GNSS 17th International Technical Meeting of the Satellite Division, Sep. 21-24, 2004, Long Beach, CA, pp. 2810-2821. (XP-002398122).
Oehler et al., "The Galileo Integrity Concept and Performance", Proceedings to the 18th ION GNSS International Technical Meeting of the Satellite Division, Munich, Sep. 2005, (Eleven (11) pages).
Ober, Pieter Bastiaan, Rick Farnworth, Edward Breeuwer, and Durk van Willigen. "Overbounding the SBAS Integrity Equation" (2001).

* cited by examiner

*Primary Examiner* — Ronnie Mancho
(74) *Attorney, Agent, or Firm* — Crowell & Moring LLP

(57) ABSTRACT

A method for determining overbounds comprises the steps of determining conservative overbounds ($q_i$) of at least one error ($\epsilon_i$) in a first phase space, multiplying the conservative overbounds ($q_i$) of errors ($\epsilon_i$) in the first phase space by a first parameter ($\theta(-x)\cdot 2$) and a second parameter ($\theta(x)\cdot 2$), and determining an upper bound for the integrity risk at the alert limit ($p_{w,int}(AL)$) in a second phase space using overbounds ($q_i$) of errors ($\epsilon_i$) in the first phase space by the first parameter ($\theta(-x)\cdot 2$) and the second parameter ($\theta(x)\cdot 2$).

2 Claims, 3 Drawing Sheets

METHOD AND APPARATUS FOR TRANSFORMING OVERBOUNDS

BACKGROUND OF THE INVENTION

This application claims the priority of European patent document 06 004 754.5, filed Mar. 8, 2006, the disclosure of which is expressly incorporated by reference herein.

The invention relates to a method and apparatus for transferring a Galileo overbound or an ICAO overbound to a pairwise overbound with excess mass (POEM).

For Global Navigation Satellite Systems (GNSS) based navigation systems for aviation, it must be assured that the position the system provides has sufficient integrity. This means that the probability that the navigation system supplies hazardously misleading information (HMI) should be proven to remain extremely small under all circumstances. The problem of trying to guarantee that such a system offers sufficient integrity is known as the overbounding problem, because practical solutions are necessarily conservative (bounding) with respect to the performance that is actually obtained. Further, Safety-of-life (SoL) GNSS augmentation systems must provide bounds on the probability that hazardous navigation errors may occur.

The integrity information sent to the user contains no explicit provisions for protecting against biases. Instead users are sent protection factors that correspond to zero-mean error distributions. The users combine the received protection factors using their own local knowledge to calculate protection levels that correspond to their position estimate. The broadcast protection factors must be sufficient such that any individual user has only a small probability (e.g. less than a one in ten million), for each approach, that their true position error exceeds the calculated protection level. The ground system for instance must guarantee these protection factors without knowing precisely where the users are, or which satellite they observe.

For determining the system's integrity, errors in the range domain are transformed into errors in the position domain. During the transformation of the errors in the range domain into the errors in the position domain, the corresponding error statistics (probability distribution functions of the errors) are transformed by the convolution which is necessary for such transformation.

In the literature, several different overbounding concepts are known. One of these concepts is the Galileo overbounding as defined by the Galileo requirements. Another concept is the paired overbounding with excess mass (POEM). The Galileo overbounding has the disadvantage that it is not preserved during convolution, whereas the POEM is preserved during convolution. That means that the convolution of two excess mass overbounding distributions will overbound the convolution of the two original convolutions. Thus, the paired overbounding concept effectively relates range domain and position domain overbounding.

SUMMARY OF THE INVENTION

One object of the present invention is to define a process and an apparatus that transforms an overbound that is not preserved during convolution into an overbound that is preserved during convolution.

This and other objects and advantages are achieved by the method and apparatus according to the invention, in which the Galileo Overbounding definition of a distribution is used to define parameters for a paired overbounding with excess mass (POEM) of the same distribution. This is necessary as the properties of the Galileo overbounding definition are not preserved during convolutions of distributions, whereas the paired overbounding with excess mass properties are preserved during convolutions of distributions. The convolution is necessary for the transformation from the range domain to the position domain.

BRIEF DESCRIPTION OF THE DRAWING FIGURES

DETAILED DESCRIPTION OF THE INVENTION

Figure 1:
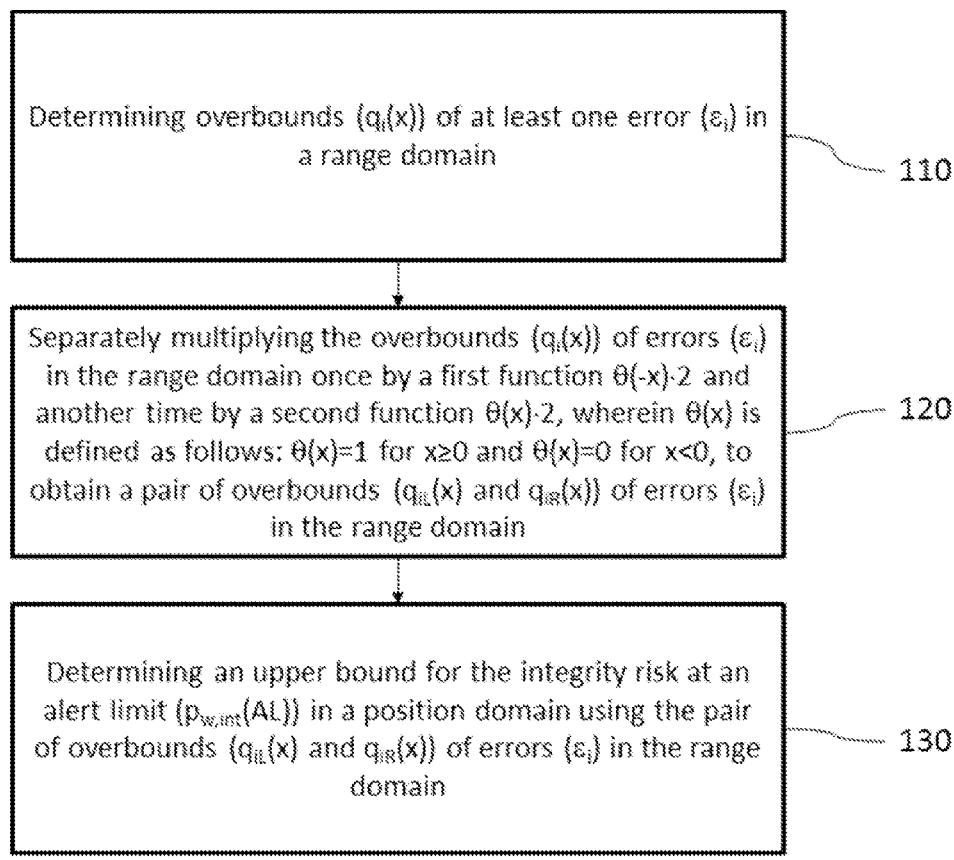
FIG. 1 illustrates a method in accordance with the present invention.

Before describing several embodiments of the invention several overbounding definitions are stated.

Galileo Overbounding Definition

For Galileo the probability density p is overbounded by a function q if the equation $$\int_{-\infty}^{-y} p(x)dx + \int_{y}^{\infty} p(x)dx \le \int_{-\infty}^{-y} q(x)dy + \int_{y}^{\infty} q(x)dx \quad (0.1)$$

for all $y \ge 0$ holds true.

It has to be noted further, that for Galileo it is foreseen to use as the overbounding distributions only Gaussian distributions of the form $$q(t) \equiv \frac{1}{\sqrt{2\pi}\,\sigma} e^{-\frac{t^2}{2\sigma^2}}. \quad (0.2)$$

It is worthwhile to note, that q is symmetric zero mean $$q(t)=q(-t), \quad (0.3)$$

zero mean $$\int_{-\infty}^{\infty} t \cdot q(t)dt = 0, \quad (0.4)$$

$$\int_{-\infty}^{0} q(t)dt = \int_{0}^{\infty} q(t)dt = 0.5, \quad (0.5)$$

and that $$\int_{a}^{b} q(x) \ge 0 \text{ for any } b \ge a. \quad (0.6)$$

It is worthwhile to note that $$\int_{a}^{b} p(x) \ge 0 \text{ for any } b \ge a \quad (0.7)$$

and that $$\int_a^b p(x) \leq 1 \text{ for any } b, a \qquad (0.8)$$

It is known from literature, that the property defined by equation (0.1) is not preserved during convolution of distributions.

Paired Overbounding with Excess Mass Definition

A probability density p is paired overbounded by the functions $q_L$ and $q_R$, if the equation $$\int_{-\infty}^y q_L(x)dx \geq \int_{-\infty}^y p(x)dx \geq 1 - \int_y^\infty q_R(x)dx \text{ for all } y \qquad (0.9)$$

holds true. The functions $q_{L/R}$ have to fulfil the following requirements.

$$q_{L/R}(x) \geq 0 \text{ for all } x \qquad (0.10)$$

and $$\int_{-\infty}^\infty q_{L/R}(x)dx = K_{L/R} \geq 1 \qquad (0.11)$$

It is known that the property defined by equation (0.9) is preserved during convolution and scaling. To ensure that the convolutions can be performed analytically it is convenient to define $q_L$ and $q_R$ as follows:

$$q_L(x) = \frac{K_L}{\sqrt{2\pi}\,\sigma_L} e^{-\frac{(x-b_L)^2}{2\sigma_L^2}} \qquad (0.12)$$

$$q_R(x) = \frac{K_R}{\sqrt{2\pi}\,\sigma_R} e^{-\frac{(x-b_R)^2}{2\sigma_R^2}} \qquad (0.13)$$

If the individual contributions of the range errors $\epsilon_i$ are paired overbounded with excess mass by the functions $$q_{L,i}(x) = \frac{K_{L,i}}{\sqrt{2\pi}\,\sigma_{L,i}} e^{-\frac{(x-b_{L,i})^2}{2\sigma_{L,i}^2}} \qquad (0.14)$$

and $$q_{R,i}(x) = \frac{K_{R,i}}{\sqrt{2\pi}\,\sigma_{R,i}} e^{-\frac{(x-b_{R,i})^2}{2\sigma_{R,i}^2}} \qquad (0.15)$$

and if the errors in the range domain $\epsilon_i$ are mapped onto the error in the position domain $\epsilon_{pos}$ by $$\epsilon_{pos} = \sum_{i=1}^n M_{w,i} \cdot \epsilon_i \qquad (0.16)$$

an upper bound for the integrity risk at the alert limit $p_{w,int}$ (AL) in the direction w is given by $$p_{w,int}(AL) \leq \frac{K_{L,M_w} + K_{R,M_w}}{2} - \frac{K_{R,M_w}}{2} \text{erf}\left(\frac{AL - b_{R,M_w}}{\sqrt{2}\,\sigma_{R,M_w}}\right) + \frac{K_{L,M_w}}{2} \text{erf}\left(\frac{-AL - b_{L,M_w}}{\sqrt{2}\,\sigma_{L,M_w}}\right) \qquad (0.17)$$

with $$g(\alpha) = \begin{cases} R, & \text{if } \alpha > 0 \\ L, & \text{if } \alpha < 0 \end{cases} \qquad (0.18)$$

$$k(\alpha) = \begin{cases} L, & \text{if } \alpha > 0 \\ R, & \text{if } \alpha < 0 \end{cases} \qquad (0.19)$$

$$K_{R,M_w} = \prod_{i=1}^n K_{g(M_{w,i}),i} \qquad (0.20)$$

$$K_{L,M_w} = \prod_{i=1}^n K_{k(M_{w,i}),i} \qquad (0.21)$$

$$b_{R,M_w} = \sum_{i=1}^n M_{w,i} b_{g(M_{w,i}),i} \qquad (0.22)$$

$$b_{L,M_w} = \sum_{i=1}^n M_{w,i} b_{k(M_{w,i}),i} \qquad (0.23)$$

$$\sigma_{R,M_w} = \sqrt{\sum_{i=1}^n \left(M_{w,i}\sigma_{g(M_{w,i}),i}\right)^2} \qquad (0.24)$$

$$\sigma_{L,M_w} = \sqrt{\sum_{i=1}^n \left(M_{w,i}\sigma_{k(M_{w,i}),i}\right)^2} \qquad (0.25)$$

ICAO Overbounding

For ICAO the probability density p is overbounded by a function q if the equations $$\int_{-\infty}^{-y} p(x)dx \leq \int_{-\infty}^{-y} q(x)dy \text{ for all } y \geq 0 \qquad (0.26)$$

$$\int_y^\infty p(x)dx \leq \int_y^\infty q(x)dy \text{ for all } y \geq 0 \qquad (0.27)$$

hold true.

The ICAO overbounding definition implies directly the Galileo overbounding definition. This can be seen by a simple addition of the defining inequalities. The opposite is not valid in general.

It has to be noted further, that for ICAO it is foreseen to use as the overbounding distributions only Gaussian distributions of the form $$q(t) \equiv \frac{1}{\sqrt{2\pi}\,\sigma} e^{-\frac{t^2}{2\sigma^2}}. \qquad (0.28)$$

It has to be further noted that ICAO states that for the receiver contribution to the error it can be assumed that $$p(x) = p(-x), \qquad (0.29)$$

$$p(\text{sign}(x)(|x|+\epsilon)) \leq p(x) \text{ for all } x \text{ and for all } \epsilon \geq 0 \qquad (0.30)$$

that is probability density p is symmetric and monotonically increasing up to a single mode in x=0 and then monotonically decreasing (p is also called unimodal).

Process for Mapping of Galileo Overbounding to Poem

Mapping without bias. As a first embodiment the process for mapping of Galileo overbounding to POEM for the case without bias is described.

For a mapping of the Galileo overbounding to POEM without bias we define $$q_{L/R} = 2q \tag{0.31}$$

We then compute, observing that q is symmetric, $$\int_{-\infty}^{y} q_L(x)dx = \int_{-\infty}^{y} 2q(x)dx = \int_{-\infty}^{y} q(x)dx + \int_{-y}^{\infty} q(x)dx. \tag{0.32}$$

For y≤0 it follows now from (0.32), (0.1), and (0.7) that $$\int_{-\infty}^{y} q_L(x)dx \geq \int_{-\infty}^{y} p(x)dy + \int_{-y}^{\infty} p(x)dx \geq \int_{-\infty}^{y} p(x)dy. \tag{0.33}$$

For y≥0 it follows now from (0.32), the first part of (0.5), and (0.8) that $$\int_{-\infty}^{y} q_L(x)dx = \int_{-\infty}^{0} q_L(x)dx + \int_{0}^{y} q_L(x)dx \tag{0.34}$$

$$= 1 + \int_{0}^{y} q_L(x)dx \geq 1 \geq \int_{-\infty}^{y} p(x)dy.$$

So it has been shown that with the definition given in (0.31) and provided that (0.1) hold true the following condition holds true for all y $$\int_{-\infty}^{y} q_L(x)dx \geq \int_{-\infty}^{y} p(x)dy \tag{0.35}$$

We now compute, observing that q is symmetric, $$1 - \int_{y}^{\infty} q_R(x)dx = 1 - \int_{y}^{\infty} 2q(x)dx \tag{0.36}$$

$$= 1 - \int_{-\infty}^{-y} q(x)dx - \int_{y}^{\infty} q(x)dx$$

For y≥0 it follows from (0.36), (0.1), and (0.7)

$$1 - \int_{y}^{\infty} q_R(x)dx = 1 - \int_{-\infty}^{-y} q(x)dx - \int_{y}^{\infty} q(x)dx \leq \tag{0.37}$$

$$1 - \int_{-\infty}^{-y} p(x)dx - \int_{y}^{\infty} p(x)dx \leq 1 - \int_{y}^{\infty} p(x)dx$$

For y≤0 if follows from the first part of (0.36), (0.5), (0.6), and (0.8)

$$1 - \int_{y}^{\infty} q_R(x)dx = 1 - \int_{0}^{\infty} 2q(x)dx - \int_{y}^{0} 2q(x)dx \tag{0.38}$$

$$= -\int_{y}^{0} 2q(x)dx \leq 0 \leq 1 - \int_{y}^{\infty} p(x)dx$$

So it has been shown with (0.37) and (0.38) that for any y the following holds true:

$$1 - \int_{y}^{\infty} q_R(x)dx \leq 1 - \int_{y}^{\infty} p(x)dx = \int_{-\infty}^{y} p(x)dx \tag{0.39}$$

Combing (0.35) and (0.39) we finally get $$\int_{-\infty}^{y} q_L(x)dx \geq \int_{-\infty}^{y} p(x)dy \geq 1 - \int_{y}^{\infty} q_R(x)dx \tag{0.40}$$

for any y.

Assuming now m satellites and on each range two different types of contributions of range errors, says $\epsilon_i$ and $\epsilon_{m+i}$ on range i∈{1, ..., m}, e.g. one type due to the system in space (errors from orbit, satellite, clock, etc.) and one due to the local effects at the receiver location (errors from atmosphere, receiver noise, multipath, etc.). Let n=2·m. Then using definition (0.31) results in $$K_{L,i} = K_{R,i} = 2 \text{ for all } i=1, \ldots, n \tag{0.41}$$

$$b_{L,i} = b_{R,i} = 0 \text{ for all } i=1, \ldots, n \tag{0.42}$$

$$\sigma_{L,i} = \sigma_{R,i} = \sigma_i = SISA_i \text{ for all } i=1, \ldots, m \text{ and } \sigma_{L,i} = \sigma_{R,i} = \sigma_i = \sigma_{u,i-m} \text{ for all } i=m+1, \ldots, n \tag{0.43}$$

for the fault free case.

Taking (0.41), (0.42), (0.43) and the equality $-\text{erf}(x) = \text{erf}(-x)$ into account, (0.17) simplifies to $$p_{w,int}(AL) \leq 2^n \left(1 - \text{erf}\left(\frac{AL}{\sqrt{2\sum_{i=1}^{n}(M_{w,i}\sigma_i)^2}}\right)\right) \tag{0.44}$$

Observing $M_i = M_{m+i}$ for all i=1, ..., m because these factors depend only on the geometry given by the m satellites and the receiver location but not on the special type of error contribution, this formular can be written as $$p_{w,int}(AL) \leq 4^m \left(1 - \text{erf}\left(\frac{AL}{\sqrt{2\sum_{i=1}^{m} M_{w,i}^2(SISA_i^2 + \sigma_{u,i}^2)}}\right)\right) \tag{0.45}$$

For the faulty case, satellite j∈{1, ..., m} is faulty, we get $$K_{L,i} = K_{R,i} = 2 \text{ for all } i = 1, \ldots, n \tag{0.46}$$

$$b_{L,i} = b_{R,i} = 0 \text{ for all } i = 1, \ldots, n \text{ with } i \neq j \tag{0.47}$$
$$\text{and } -b_{L,j} = b_{R,j} = TH_j$$

$$\sigma_{L,i} = \sigma_{R,i} = \sigma_i = SISA_i \text{ for all } i = 1, \ldots, m \text{ with } i \neq j \tag{0.47'}$$
$$\text{and } \sigma_{L,i} = \sigma_{R,i} = \sigma_i = \sigma_{u,i-m} \text{ for all } l = m+1, \ldots, n$$
$$\text{and } \sigma_{L,j} = \sigma_{R,j} = \sigma_j = SISMA_j$$

$$p_{w,int}(AL) \le 2^n \left(1 - \text{erf}\left(\frac{AL - |M_{w,j}|TH_j}{\sqrt{2\sum_{i=1}^{n}(M_{w,i}\sigma_i)^2}}\right)\right) \quad (0.48)$$

Again observing $M_i = M_{m+i}$ for all $i=1, \ldots, m$ this formular can be written as $$p_{w,int}(AL) \le 4^m \left(1 - \text{erf}\left(\frac{AL - |M_{w,j}|TH_j}{\sqrt{\begin{array}{c}2\sum_{i=1,i\ne j}^{m} M_{w,i}^2(SISA_i^2 + \sigma_{u,i}^2) + \\ 2M_{w,j}^2(SISMA_j^2 + \sigma_{u,j}^2)\end{array}}}\right)\right) \quad (0.49)$$

Mapping with Bias.

As a second embodiment the process for mapping of Galileo overbounding to POEM for the case with bias is described.

For a mapping of the Galileo overbounding to POEM with bias we define $$q'_L(x) = \theta(-x)2q(x) \quad (0.50)$$

$$q'_R(x) = \theta(x)2q(x) \quad (0.51)$$

where $\theta$ is a function, defined for real values x by $$\theta(x) = \begin{cases} 1, & \text{if } x \ge 0 \\ 0, & \text{otherwise.} \end{cases}$$

For $y \le 0$ we then compute, observing that q is symmetric, $$\int_{-\infty}^{y} q'_L(x)dx = \int_{-\infty}^{y} 2q(x)dx = \int_{-\infty}^{y} q(x)dx + \int_{-y}^{\infty} q(x)dx. \quad (0.52)$$

It follows now from (0.52), (0.1), and (0.7) that $$\int_{-\infty}^{y} q'_L(x)dx \ge \int_{-\infty}^{y} p(x)dy + \int_{-y}^{\infty} p(x)dx \ge \int_{-\infty}^{y} p(x)dy. \quad (0.53)$$

For $y \ge 0$ it follows from first part of (0.5), and (0.8) that $$\int_{-\infty}^{y} q'_L(x)dx = \int_{-\infty}^{0} q'_L(x)dx + \int_{0}^{y} q'_L(x)dx \quad (0.54)$$

$$= 1 + 0 \ge 1 \ge \int_{-\infty}^{y} p(x)dy.$$

So it has been shown that with the definition given in (0.50) and provided that (0.1) hold true the following condition holds true for all y $$\int_{-\infty}^{y} q'_L(x)dx \ge \int_{-\infty}^{y} p(x)dy \quad (0.55)$$

We now compute for $y \ge 0$ and observing that q is symmetric, $$1 - \int_{y}^{\infty} q'_R(x)dx = 1 - \int_{y}^{\infty} 2q(x)dx \quad (0.56)$$

$$= 1 - \int_{-\infty}^{-y} q(x)dx - \int_{y}^{\infty} q(x)dx$$

It follows from (0.56), (0.1), and (0.7)

$$1 - \int_{y}^{\infty} q'_R(x)dx = 1 - \int_{-\infty}^{-y} q(x)dx - \int_{y}^{\infty} q(x)dx \le \quad (0.57)$$

$$1 - \int_{-\infty}^{-y} p(x)dx - \int_{y}^{\infty} p(x)dx \le$$

$$1 - \int_{y}^{\infty} p(x)dx$$

For $y \le 0$ if follows from (0.5), (0.6), and (0.8)

$$1 - \int_{y}^{\infty} q'_R(x)dx = 1 - \int_{0}^{\infty} q'_R(x)dx \quad (0.58)$$

$$= 1 - \int_{0}^{\infty} 2q(x)dx$$

$$= 0 \le 1 - \int_{y}^{\infty} p(x)dx$$

So we have shown with (0.57) and (0.58) that for any y the following holds true:

$$1 - \int_{y}^{\infty} q'_R(x)dx \le 1 - \int_{y}^{\infty} p(x)dx = \int_{-\infty}^{y} p(x)dx \quad (0.59)$$

Combining (0.55) and (0.59) we finally get $$\int_{-\infty}^{y} q'_L(x)dx \ge \int_{-\infty}^{y} p(x)dy \ge 1 - \int_{y}^{\infty} q'_R(x)dx \quad (0.60)$$

for any y.

Assuming again as above m satellites and on each range two different types of contributions of range errors, say and $\epsilon_i$ and $\epsilon_{m+i}$ on range $i \in \{1, \ldots, m\}$, e.g. one due to the system in space (errors from orbit, satellite, clock, etc.) and one due to the local effects at the receiver location (errors from atmosphere, receiver noise, multipath, etc.). Let $n=2 \cdot m$. Then it is possible to prove that probability densities $p_i$ are paired overbounded by the functions $q_{L,i}$ and $q_{R,i}$ defined by equations (0.14) and (0.15) with $$\sigma_{L,i} = \sigma_{R,i} = \sigma_i = SISA_i \text{ for all } i = 1, \ldots, m \text{ and} \quad (0.61)$$
$$\sigma_{L,i} = \sigma_{R,i} = \sigma_i = \sigma_{u,i-m} \text{ for all } i = m+1, \ldots, n$$

$$-b_{L,i} = b_{R,i} = b_i > 0 \text{ for all } i = 1, \ldots, n \quad (0.62)$$

$$K_{L,i} = K_{R,i} = K_i = 2 \cdot \left(1 + \text{erf}\left(\frac{b_i}{\sigma_i\sqrt{2}}\right)\right)^{-1} \text{ for all } i = 1, \ldots, n \quad (0.63)$$

for the fault free case.

Taking these definitions into account and remembering equality $-\text{erf}(x) = \text{erf}(-x)$, equation (0.17) simplifies to $$p_{w,int}(AL) \leq \frac{2^n}{\prod_{i=1}^{n}\left(1+\mathrm{erf}\left(\frac{b_i}{\sigma_i\sqrt{2}}\right)\right)} \cdot \left(1-\mathrm{erf}\left(\frac{AL-\sum_{i=1}^{n}|M_{w,i}|b_i}{\sqrt{2\sum_{i=1}^{n}(M_{w,i}\sigma_i)^2}}\right)\right) \quad (0.64)$$

Observing again $M_i = M_{m+i}$ for all $i=1, \ldots m$ because these factors depend only on the geometry given by the m satellites and the receiver location but not on the special type of error contribution, this formular can be written as $$p_{w,int}(AL) \leq \frac{4^m}{\prod_{i=1}^{m}\left(1+\mathrm{erf}\left(\frac{b_i}{SISA_i\sqrt{2}}\right)\right)\cdot\prod_{i=1}^{m}\left(1+\mathrm{erf}\left(\frac{b_{m+i}}{\sigma_{u,i}\sqrt{2}}\right)\right)} \cdot$$

$$\left(1-\mathrm{erf}\left(\frac{AL-\sum_{i=1}^{m}|M_{w,i}|(b_i+b_{m+i})}{\sqrt{2\sum_{i=1}^{m}M_{w,i}^2(SISA_i^2+\sigma_{u,i}^2)}}\right)\right)$$

For the faulty case, satellite $j \in \{1, \ldots, m\}$ is faulty, we get $$\sigma_{L,i}=\sigma_{R,i}=\sigma_i=SISA_i \text{ for all } i=1,\ldots,m \text{ with } i\neq j \quad (0.65)$$
$$\text{and } \sigma_{L,i}=\sigma_{R,i}=\sigma_i=\sigma_{u,i-m} \text{ for all } i=m+1,$$
$$\ldots, n \text{ and } \sigma_{L,j}=\sigma_{R,j}=\sigma_j=SISMA_j$$

$$-b_{L,i}=b_{R,i}=b_i>0 \text{ for all } i=1,\ldots,n \text{ with } i\neq j \quad (0.65')$$
$$\text{and } -b_{L,j}=b_{R,j}=b_j+TH_j$$

$$K_{L,i}=K_{R,i}=K_i=2\cdot\left(1+\mathrm{erf}\left(\frac{b_i}{\sigma_i\sqrt{2}}\right)\right)^{-1} \quad (0.66)$$
$$\text{for all } i=1,\ldots,n, \text{ i.e. inclusive } j$$

$$p_{w,int}(AL) \leq \frac{2^n}{\prod_{i=1}^{n}\left(1+\mathrm{erf}\left(\frac{b_i}{\sigma_i\sqrt{2}}\right)\right)} \cdot \quad (0.67)$$

$$\left(1-\mathrm{erf}\left(\frac{AL-|M_{w,j}|TH_j-\sum_{i=1}^{n}|M_{w,i}|b_i}{\sqrt{2\sum_{i=1}^{n}(M_{w,i}\sigma_i)^2}}\right)\right)$$

As shown before several times (e.g. see inequalities (0.44) and (0.45)) this formular can be written using the original symbols. This will be omitted here.

More worthy of mention is the fact that different choices of $b_i$ lead to different values for $p_{w,int}(AL)$. The optimal choice, that gives smallest $p_{w,int}(AL)$, depends on the actual satellite/user geometry. Therefore the user has to determine the optimal choice of $b_i$ by himself.

Process for Mapping of ICAO Overbounding to Poem

As a third embodiment the process for mapping of ICAO overbounding to POEM is described.

As already stated ICAO overbounding implies Galileo overbounding. Therefore the method of mapping Galileo overbounding to POEM described before is also applicable for ICAO overbounding.

The question arising is whether it is possible to get a factor smaller than 2 as necessary when mapping Galileo overbounding to POEM by definition of $q_{L/R} \equiv 2q$ for mapping without bias and $q'_L(x) \equiv \theta(-x)2q(x)$ and $q'_R(x) \equiv \theta(x)2q(x)$ for mapping with bias.

A positive function $q_L$ is part of POEM if inequality $$\int_{-\infty}^{y} q_L(x)dx \geq \int_{-\infty}^{y} p(x)dx$$

is fulfilled for all y. For negative y we have the same inequality for q itself. But for positive values of y we know nothing but $$\int_{-\infty}^{y} p(x)dx \leq 1.$$

Therefore the only condition we can use is $$\int_{-\infty}^{y} q_L(x)dx \geq 1$$

for all positive values of y. For reasons of continuity the same is valid for y=0. Using the Gaussian type of $q_L$ we calculate $$\int_{-\infty}^{y} q_L(x)dx = \frac{K_L}{2}\cdot\left(1+\mathrm{erf}\left(\frac{y}{\sigma_L\sqrt{2}}\right)\right).$$

Inserting y=0 leads to $$1 \leq \int_{-\infty}^{0} q_L(x)dx = \frac{K_L}{2}\cdot\left(1+\mathrm{erf}\left(\frac{0}{\sigma_L\sqrt{2}}\right)\right) = \frac{K_L}{2} \Rightarrow K_L \geq 2,$$

which answers the above question: we can not get a smaller factor than 2 in the definition of $q_L$.

A positive function $q_R$ is part of POEM if inequality $$1-K_R+\int_{-\infty}^{y} q_R(x)dx \leq \int_{-\infty}^{y} p(x)dx$$

is fulfilled for all y. For positive y we have the same inequality for q itself (because $K_R=1$ for $q_R \equiv q$). But for negative values of y we know nothing but $$0 \leq \int_{-\infty}^{y} p(x)dx.$$

Therefore the only condition that can be used is $$1-K_R+\int_{-\infty}^{y} q_R(x)dx \leq 0$$

for all negative values of y. For reasons of continuity the same is valid for y=0. Using now the Gaussian type of $q_R$, calculating the integral and inserting y=0 leads to $$1 - \frac{K_R}{2} = 1 - K_R + \frac{K_R}{2} \cdot \left(1 + \text{erf}\left(\frac{0}{\sigma_R \sqrt{2}}\right)\right)$$

$$= 1 - K_R + \int_{-\infty}^{0} q_R(x) dx \leq 0 \Rightarrow K_R \geq 2$$

which answers the above question: we can not get a smaller factor than 2 in the definition of $q_R$.

The invention further discloses an apparatus that is configured to execute the methods described above. Such an apparatus could be part of one of the GNSS, e.g. a satellite of the GNSS or some ground systems or the receiver of a user.

Although the invention has been described for GNSS and the overbounding concepts Galileo Overbounding, ICAO Overbounding and Paired Overbounding with Excess Mass. However, it is to be understood by those skilled in the art that the invention is neither limited to GNSS nor to Galileo Overbounding, ICAO Overbounding and Paired Overbounding with Excess Mass, respectively.

An exemplary method in accordance with the present invention is illustrated in FIG. 1. Specifically, overbounds ($q_i(x)$) of at least one error ($\epsilon_i$) in a range domain is determined (step 110). The overbounds ($q_i(x)$) of errors ($\epsilon_i$) in the range domain are separately multiplied once by a first function $\theta(-x) \cdot 2$ and another time by a second function $\theta(x) \cdot 2$, wherein $\theta(x)$ is defined as follows: $\theta(x)=1$ for $x \geq 0$ and $\theta(x)=0$ for $x<0$, to obtain a pair of overbounds ($q_{iL}(x)$ and $q_{iR}(x)$) of errors ($\epsilon_i$) in the range domain (step 120). An upper bound for the integrity risk at an alert limit ($p_{w,int}(AL)$) in a position domain is determined using the pair of overbounds ($q_{iL}(x)$ and $q_{iR}(x)$) of errors ($\epsilon_i$) in the range domain (step 130).

For further clarifications the following is disclosed:

Prerequisites:

$$\tilde{q}_L := 2\chi_{(-\infty,0]} q, \quad q := \frac{1}{\sqrt{2\pi}\sigma} \exp\left(-\frac{1}{2}\left(\frac{\cdot}{\sigma}\right)^2\right)$$

$$q_L := \frac{K}{\sqrt{2\pi}\sigma} \exp\left(-\frac{1}{2}\left(\frac{\cdot - \mu}{\sigma}\right)^2\right) \text{ with } \mu < 0$$

Which conditions have to be stipulated on K and $\mu$, that it holds:

Let $z \geq 0$: It holds $$F_{\tilde{q}_L} \leq F_{q_L} \quad (1)$$

$$F_{\tilde{q}_L}(z) = 1 \overset{!}{\leq} F_{q_L}(0) \overset{\text{monotonic increasing}}{\leq} F_{q_L}(z) = \frac{K}{2}\left(1 + \text{erf}\left(\frac{z-\mu}{\sqrt{2}\sigma}\right)\right)$$

$$\Rightarrow 1 \overset{!}{\leq} \frac{K}{2}\left(1 + \text{erf}\left(\frac{-\mu}{\sqrt{2}\sigma}\right)\right).$$

Then it holds $F_{\tilde{q}_L}(z) \leq F_{q_L}(z)$ for $z \geq 0$.

Set $$K := \frac{2}{\left(1 + \text{erf}\left(\frac{-\mu}{\sqrt{2}\sigma}\right)\right)},$$

i.e. the smallest K will be used.

Let $z<0$: It is $$F_{\tilde{q}_L}(z) = \int_{-\infty}^{z} 2\chi_{(-\infty,0]}(x) q(x) dx =$$

$$2\int_{-\infty}^{z} q(x) dx = 2F_q(z) = 2 \cdot \frac{1}{2} \cdot \left(1 + \text{erf}\left(\frac{z}{\sqrt{2}\sigma}\right)\right) = 1 + \text{erf}\left(\frac{z}{\sqrt{2}\sigma}\right),$$

i.e. (1) is equivalent to $$1 + \text{erf}\left(\frac{z}{\sqrt{2}\sigma}\right) \overset{!}{\leq} \frac{K}{2}\left(1 + \text{erf}\left(\frac{z-\mu}{\sqrt{2}\sigma}\right)\right).$$

With the K from above this will be:

$$1 + \text{erf}\left(\frac{z}{\sqrt{2}\sigma}\right) \overset{!}{\leq} \frac{1 + \text{erf}\left(\frac{z-\mu}{\sqrt{2}\sigma}\right)}{\underbrace{1 + \text{erf}\left(\frac{-\mu}{\sqrt{2}\sigma}\right)}_{\geq 0, \text{ for } \mu<0}}.$$

Abbreviate: $\tilde{z} := z/(\sqrt{2}\sigma)$, $\tilde{\mu} := \mu/(\sqrt{2}\sigma)$ and multiply with (the positive) denominator of the right side, then (1) is equivalent to $$(1 + \text{erf}(\tilde{z}))(1 + \text{erf}(-\tilde{\mu})) \overset{!}{\leq} 1 + \text{erf}(\tilde{z} - \tilde{\mu}) |-1 \quad (2)$$

$$\Leftrightarrow \text{erf}(\tilde{z}) + \underbrace{\text{erf}(-\tilde{\mu})}_{=|\tilde{\mu}|} + \text{erf}(\tilde{z}) \cdot \text{erf}(-\tilde{\mu}) \overset{!}{\leq} \text{erf}(\tilde{z} - \tilde{\mu}) \left| \cdot \frac{\sqrt{\pi}}{2} \right.$$

$$\overset{f(t):=\exp(-t^2)}{\Leftrightarrow} \int_0^{\tilde{z}} f + \int_0^{|\tilde{\mu}|} f + \text{erf}(\tilde{z}) \int_0^{|\tilde{\mu}|} f \overset{!}{\leq} \int_0^{\tilde{z} - \tilde{\mu}} f$$

Distinction of cases: 1. $\tilde{\mu} \leq \tilde{z} < 0$ and 2. $\tilde{z} < \tilde{\mu}$.

So let $\tilde{\mu} \leq \tilde{z} < 0$. Consider because of $$\underbrace{\text{erf}(\tilde{z})}_{<0} \underbrace{\int_0^{|\tilde{\mu}|} f}_{>0} < 0 : \int_0^{\tilde{z}} f + \int_0^{|\tilde{\mu}|} f \overset{\tilde{z}<0, f \text{ symmetric at } 0}{=} \int_{|\tilde{z}|}^{0} f + \int_0^{|\tilde{\mu}|} f = \int_{|\tilde{z}|}^{|\tilde{\mu}|} f.$$

Notice $|\tilde{\mu}| \geq |\tilde{z}|$. (*)

Furthermore, because of $\tilde{\mu} \leq \tilde{z}$: $\tilde{z} - \tilde{\mu} = |\tilde{z} - \tilde{\mu}|$, therefore $$\int_0^{\tilde{z}-\tilde{\mu}} f = \int_0^{|\tilde{z}-\tilde{\mu}|} f.$$

Now it holds $|\tilde{\mu}| - |\tilde{z}| = ||\tilde{\mu}| - |\tilde{z}|| \leq |\tilde{z} - \tilde{\mu}|$ and f is monotone decreasing for positive arguments, therefore it holds $$\int_{|\tilde{z}|}^{|\tilde{\mu}|} f \leq \int_0^{|\tilde{z}-\tilde{\mu}|} f$$

Figure 2:
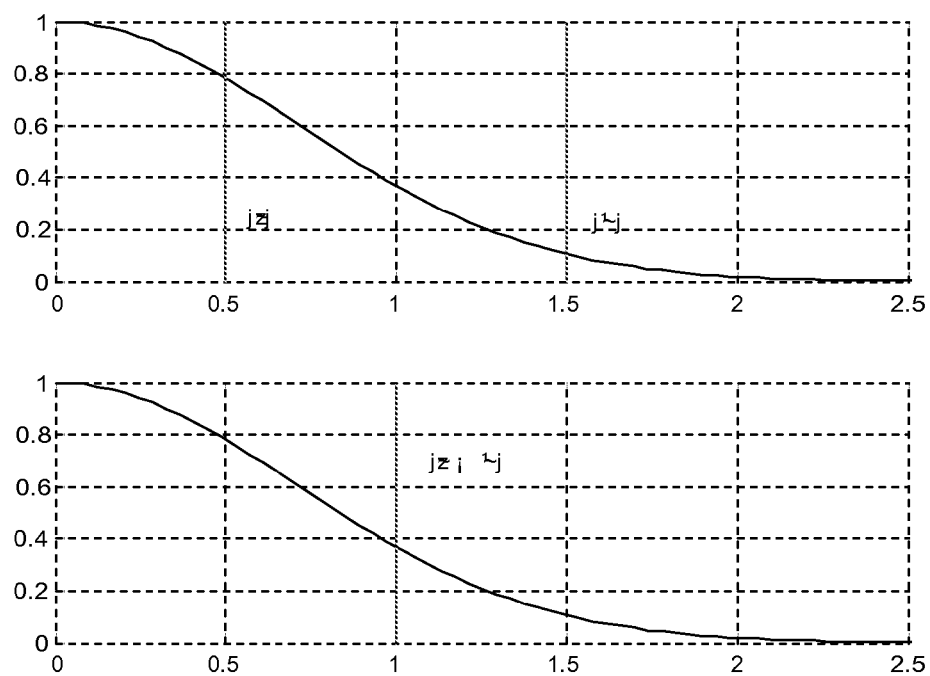
FIG. 2 are graphs illustrating two functions.

(see FIG. 2)

Altogether it has been shown:

$$\int_0^{\tilde{z}} f + \int_0^{|\tilde{\mu}|} f + \text{erf}(\tilde{z}) \cdot \int_0^{|\tilde{\mu}|} f < \int_0^{\tilde{z}} f + \int_0^{|\tilde{\mu}|} f =$$

$$\int_{|\tilde{z}|}^{|\tilde{\mu}|} f \le \int_0^{|\tilde{z}-\tilde{\mu}|} f = \int_0^{\tilde{z}-\tilde{\mu}} f,$$

that is (2) for $\mu \le z < 0$.

Now let $\tilde{z} < \tilde{\mu}$, i.e. $\tilde{z} - \tilde{\mu} < 0$.
As above (*), it follows $$\int_0^{\tilde{z}} f + \int_0^{|\tilde{\mu}|} f = \int_{|\tilde{z}|}^{|\tilde{\mu}|} f = -\int_{|\tilde{\mu}|}^{|\tilde{z}|} f.$$

Analogue it holds because of the symmetry of f for the right side of (2):

$$\int_0^{\tilde{z}-\tilde{\mu}} f = -\int_{\tilde{z}-\tilde{\mu}}^{0} f = -\int_0^{-(\tilde{z}-\tilde{\mu})} f = -\int_0^{\tilde{\mu}-\tilde{z}} f.$$

Therefore, (2) is equivalent to:

$$-\int_{|\tilde{\mu}|}^{|\tilde{z}|} f + \text{erf}(\tilde{z}) \int_0^{|\tilde{\mu}|} f \overset{!}{\le} -\int_0^{\tilde{\mu}-\tilde{z}} f \cdot \overset{\text{erf}(\tilde{z})=-\text{erf}(|\tilde{z}|)}{\Longleftrightarrow} \int_0^{\tilde{\mu}-\tilde{z}} f \le \int_{|\tilde{\mu}|}^{|\tilde{z}|} f + \text{erf}(|\tilde{z}|) \int_0^{|\tilde{\mu}|} f.$$

Now showing (3):

$$\int_{|\tilde{\mu}|}^{|\tilde{z}|} f + \text{erf}(|\tilde{z}|) \cdot \int_0^{|\tilde{\mu}|} f = \int_{|\tilde{\mu}|}^{|\tilde{z}|} f + (1 - \text{erfc}(|\tilde{z}|)) \cdot \int_0^{|\tilde{\mu}|} f \quad (4)$$

$$= \int_0^{|\tilde{z}|} f - \text{erfc}(|\tilde{z}|) \cdot \int_0^{|\tilde{\mu}|} f = \ldots$$

$$\overset{\tilde{\mu}-\tilde{z}<|\tilde{z}|, \text{ for } \tilde{\mu}<0}{\ge} \int_0^{\tilde{\mu}-\tilde{z}} f + \int_{\tilde{\mu}-\tilde{z}}^{|\tilde{z}|} f - \overline{\text{erfc}(|\tilde{z}|)}^{>0} \int_0^{|\tilde{\mu}|} f \ge \ldots$$

$$\overset{0 \le f \le 1}{\ge} \int_0^{\tilde{\mu}-\tilde{z}} f + \min_{x \in [\tilde{\mu}-\tilde{z}, |\tilde{z}|]} f(x) \cdot \overline{(|\tilde{z}| - (\tilde{\mu}-\tilde{z}))}^{=-\tilde{z}-\tilde{\mu}+\tilde{z}=|\tilde{\mu}|} - \text{erfc}(|\tilde{z}|) \cdot$$

$$\overline{\max_{x \in [0,|\tilde{\mu}|]} f(x)}^{=1} \cdot (|\tilde{\mu}| - 0) =$$

$$\overset{f \text{ is monotone decreasing}}{=} \int_0^{\tilde{\mu}-\tilde{z}} f + f(|\tilde{z}|) \cdot |\tilde{\mu}| - \text{erfc}(|\tilde{z}|) \cdot |\tilde{\mu}|$$

Now it holds $$\text{erfc}(x) \le f(x) \text{ for } x > 0.$$

$$\left[ \text{erfc}(x) = \frac{2}{\sqrt{\pi}} \int_x^{\infty} \exp(-t^2) dt \overset{u:=t-x}{\underset{du=dt}{=}} \frac{2}{\sqrt{\pi}} \int_0^{\infty} \exp(-(u+x)^2) du \right.$$

$$= \frac{2}{\sqrt{\pi}} \int_0^{\infty} \exp(-u^2) \cdot \exp(-2ux - x^2) du$$

$$= \exp(-x^2) \frac{2}{\sqrt{\pi}} \int_0^{\infty} \underbrace{\exp(-u^2)}_{>0} \underbrace{\exp(-2ux)}_{0 < \ldots \le 1, \text{ for } x > 0, u \ge 0} du$$

$$\le \exp(-x^2) \frac{2}{\sqrt{\pi}} \int_0^{\infty} \exp(-u^2) du$$

$$\left. = \exp(-x^2) \equiv f(x) \right]$$

Therefore, it holds because of (4)

(3)

$$\int_{|\tilde{\mu}|}^{|\tilde{z}|} f + \text{erf}(|\tilde{z}|) \cdot \int_0^{|\tilde{\mu}|} f \ge \int_0^{\tilde{\mu}-\tilde{z}} f + f(|\tilde{z}|) \cdot |\tilde{\mu}| - f(|\tilde{z}|) \cdot |\tilde{\mu}| = \int_0^{\tilde{\mu}-\tilde{z}} f,$$

that is (3) for $z < \mu$.

Because (3) $\Leftrightarrow$ (2) $\Leftrightarrow$ (1), everything has been shown.

Add on for faulty case: Satellite j faulty! Shift $TH_j$.

Figure 3:
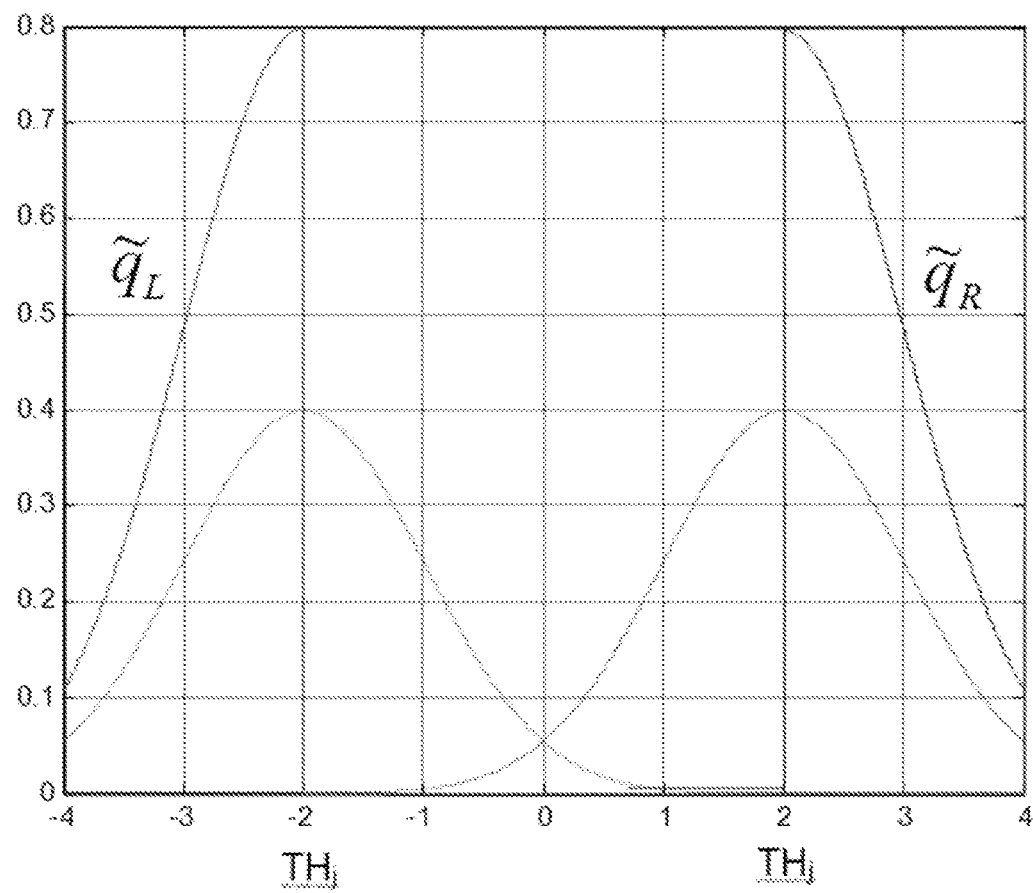
FIG. 3 is a graph illustrating the overbounding condition.

Referring to FIG. 3, the overbounding condition without shift by $TH_j$ fulfilled, i.e.

$$q := \frac{1}{\sqrt{2\pi}\,\sigma} \exp\left(-\frac{1}{2}\left(\frac{\cdot}{\sigma}\right)^2\right)$$

$$\tilde{q}_{L,S} := 2\chi_{(-\infty,-TH]} q(\cdot + TH),$$

$$\tilde{q}_{R,S} := 2\chi_{(0,\infty)} q(\cdot - TH),$$

$$q_{L,S} := \frac{K}{\sqrt{2\pi}\,\sigma} \exp\left(-\frac{1}{2}\left(\frac{\cdot + TH - \mu_L}{\sigma}\right)^2\right) \text{ with } \mu_L < 0$$

$$q_{R,S} := \frac{K}{\sqrt{2\pi}\,\sigma} \exp\left(-\frac{1}{2}\left(\frac{\cdot - TH - \mu_R}{\sigma}\right)^2\right) \text{ with } \mu_R > 0$$

$$F_{\tilde{q}_{L,S}} \le F_{q_{L,S}} : F_{\tilde{q}_{L,S}}(z) = F_{\tilde{q}_L}(z+TH) \le F_{q_L}(z+TH) = F_{q_{L,S}}(z)$$

with $K_L$ as above!

(Let $z \geq -TH$: It holds $$F_{\tilde{q}_{L,S}}(z) = 1 \stackrel{!}{\leq} F_{q_{L,S}}(-TH) \leq F_{q_{L,S}}(z)$$
$$= F_{q_L}(z + TH)$$
$$= \frac{K}{2}\left(1 + \text{erf}\left(\frac{z - (\mu_L - TH)}{\sqrt{2}\sigma}\right)\right)$$

$\boxed{\text{ok}}) \Rightarrow 1 \stackrel{!}{\leq} \frac{K}{2}\left(1 + \text{erf}\left(\frac{-\mu_L}{\sqrt{2}\sigma}\right)\right)$

Claim:

$F^*_{\tilde{q}_{R,S}} \leq F_{p(-TH)}$, $F_{p(+TH)} \leq F_{\tilde{q}_{L,S}}: F_{\tilde{q}_{L,S}}(z) = 2\int_{-\infty}^{z} \chi_{(-\infty,-TH]}(x)q(x+TH)dx \stackrel{y:=x+TH}{=}$ $$2\int_{-\infty}^{z+TH} \underbrace{\chi_{(-\infty,-TH]}(y-TH)}_{=\chi_{(-\infty,0]}(y)} q(y)dy \ldots =$$

$$\int_{-\infty}^{z+TH} 2\chi_{(-\infty,0]}(y)q(y)dy = F_{\tilde{q}_L}(z+TH)$$

Therefore, it holds $$F_{p(+TH)}(z) = \int_{-\infty}^{z} p(x+TH)dx =$$

$$\int_{-\infty}^{z+TH} p(y)dy = F_p(z+TH) \leq F_{\tilde{q}_L}(z+TH) \leq F_{\tilde{q}_{L,S}}(z)F^*_{\tilde{q}_{R,S}}(z) =$$

$$\underbrace{1 - K_R}_{=1} + F_{\tilde{q}_{R,S}}(z) \stackrel{as\ above}{=}$$

$$F_{\tilde{q}_R}(z - TH) \leq F_p(z - TH) = F_{p(-TH)}(z) \boxed{\text{ok}}$$

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining limiting overbounds in a satellite positioning system, said method comprising the steps of:
   determining overbounds ($q_i(x)$) of at least one error ($\epsilon_i$) in a range domain, wherein the at least one error ($\epsilon_i$) in the range domain is an error in a determination of a distance between a satellite of the satellite positioning system and a user receiver in the satellite positioning system;
   separately multiplying the overbounds ($q_i(x)$) of errors ($\epsilon_i$) in the range domain once by a first function $\theta(-x)\cdot 2$ and another time by a second function $\theta(x)\cdot 2$, wherein $\theta(x)$ is defined as follows: $\theta(x)=1$ for $x\geq 0$ and $\theta(x)=0$ for $x<0$, to obtain a pair of overbounds ($q_{iL}(x)$ and $q_{iR}(x)$) of errors ($\epsilon_i$) in the range domain;
   determining an upper bound for an integrity risk at an alert limit ($p_{w,int}$(AL)) in a position domain using the pair of overbounds ($q_{iL}(x)$ and $q_{iR}(x)$) of errors ($\epsilon_i$) in the range domain; and
   determining whether an error in a calculation of a position of the user receiver exceeds the upper bound for the integrity risk at the alert limit,
   wherein the steps are performed by a ground system in the satellite positioning system or the user receiver in the satellite positioning system for a plurality of satellites of the satellite positioning system.

2. A non-transitory computer readable medium encoded with a program for determining limiting overbounds in a satellite positioning system, by performing the following steps:
   determining overbounds ($q_i(x)$) of at least one error ($\epsilon_i$) in a range domain, wherein the at least one error ($\epsilon_i$) in the range domain is an error in a determination of a distance between a satellite of the satellite positioning system and a user receiver in the satellite positioning system;
   separately multiplying the overbounds ($q_i(x)$) of errors ($\epsilon_i$) in the range domain once by a first function $\theta(-x)\cdot 2$ and another time by a second function $\theta(x)\cdot 2$, wherein $\theta(x)$ is defined as follows: $\theta(x)=1$ for $x\geq 0$ and $\theta(x)=0$ for $x<0$, to obtain a pair of overbounds ($q_{iL}(x)$ and $q_{iR}(x)$) of errors ($\epsilon_i$) in the range domain;
   determining an upper bound for an integrity risk at an alert limit ($p_{w,int}$(AL)) in a position domain using the pair of overbounds ($q_{iL}(x)$ and $q_{iR}(x)$) of errors ($\epsilon_i$) in the range domain; and
   determining whether an error in a calculation of a position of the user receiver exceeds the upper bound for the integrity risk at the alert limit,
   wherein the steps are performed by a ground system in the satellite positioning system or by the user receiver in the satellite positioning system for a plurality of satellites of the satellite positioning system.

* * * * *